Patented Dec. 3, 1940

2,223,790

UNITED STATES PATENT OFFICE 2,223,790

DENATURED ALCOHOL COMPOSITION

Paul Mahler, New York, N. Y., and Carl Haner, Moylan, Pa., assignors to Publicker, Inc., Philadelphia, Pa., a corporation of Delaware No Drawing. Application October 15, 1937, Serial No. 169,256

7 Claims. (Cl. 202—77)

The present invention relates to certain new and useful denatured alcohol compositions and it relates more particularly to denatured alcohol compositions which will be more resistant to commercially feasible "clean-up" procedures, than any one compound or compounds belonging to the same chemical class, and which will be more desirable for use for most commercial purposes.

We have found that a certain class or type of organic compounds, in combination with ethyl alcohol, possess desirable denaturant qualities in that they resist the chemical "clean-up" technique as well as fractional distillation and boil over or distil over with the alcohol, or at least in part, sufficient to impart to the resultant alcohol a characteristic taste and/or odor sufficient to make it unfit for beverage purposes.

Denaturants belonging to certain separate organic groups have been found to have certain inherent weaknesses when used by themselves, which may react unfavorably to their individual use.

Moreover, we have found that the denaturant effect of a given amount or proportion of any member of one class or group, is greater when associated with one or more members of another class or group of compounds than when it is used by itself. Thus, in the case of certain aldehydes, a rather pungent odor is imparted which may at times be objectionable and furthermore the residual odor on evaporation lasts longer than might be desired for certain uses. In the case of the nitriles, larger quantities impart a somewhat disagreeable odor to the alcohol which may be objectionable for some commercial uses. Ketones in general impart an aromatic odor and taste to the rectified alcohol which is not as strong a protection against its illicit use than if the taste were objectionable.

These weaknesses can be overcome by the herein disclosed combination of two or more materials, each of which possesses distinctive denaturant qualities that in combination greatly reduces the objectionable features of the individual materials.

We have found, according to the present invention, that by combining members of different chemical groups or of different chemical families, as for instance, an aldehyde and a saturated ketone such as methyl isobutyl ketone, and an unsaturated ketone such as mesityl oxide, and a nitrile produces a composition, when combined with ethyl alcohol, which will possess advantages not possessed by a composition containing ethyl alcohol and only one of these other compounds. Whereas each of the materials or compounds used in the denaturing mixture is a good denaturant when employed in the proportion of from one to two parts to one hundred parts of alcohol, it does not necessarily follow that the same denaturant when used in the proportion found in the mixture would either adequately protect the alcohol or give it the desired characteristics for commercial uses. However, the combination of the compounds as found in the composition is an effective denaturant. To illustrate: a denaturant composition consisting of five parts butyraldehyde, sixty-three parts methyl isobutyl ketone and thirty-two parts mesityl oxide is very effective as a denaturant when used in the proportion of two parts to one hundred parts of alcohol. However, an alcohol denatured with $\frac{1}{10}$ part of the aldehyde alone (the actual amount of aldehyde in the denaturing composition) would be ineffective. An alcohol denatured with 1.26 parts methyl isobutyl ketone alone would impart a very pleasant odor and taste to the recovered spirit and an alcohol denatured with 0.64 part of mesityl oxide alone might not give a properly denatured alcohol. However, the combination of the three materials used in the above proportions produces an alcohol which appears to be better denatured than any heretofore obtained.

It is believed, and experiments seem to verify this belief, that an excess denaturant produces no beneficial results. This is so because after the various physical "clean-up" treatments, the only effective quantity of the materials is that which remains in the diluted alcohol solution, the rest having been thrown out and removed by the solvents. Therefore, there is nothing to be gained by increasing the amount of the denaturant above the quantity which will remain in solution. This has been verified in several instances. Thus, $\frac{1}{10}$ part mesityl oxide is as effective as two parts. Similarly, 1.4 parts of pinacolone is as good as two parts. What the minimum quantity of any particular denaturant compound must be in order to give proper denaturation will, of course, depend upon its solubility in any particular "clean-up" solvent.

The denaturing effect of a mixture containing two or more components appears to be effected by the relative proportions of these components in the denatured alcohol composition. Thus, a mixture made up of 50% butyraldehyde, 12½% methyl isobutyl ketone, and 37½% mesityl oxide is not nearly as effective as one containing 5%, 63%, and 32%, respectively, of these components, even though two parts of both denaturing mixtures are used (in relation to one hundred parts of alcohol). We believe this behavior to be due to the materials remaining in the aqueous solution distilling as an azeotrope. However, it is not unlikely that changing the proportions of these components may also affect their respective solubilities in the aqueous alcohol solution. Either or both of these effects may be responsible for the peculiar change in the denaturation of mixtures composed of the same materials but of different proportions.

There is another class of denaturants which may be varyingly affected by the type of chemical treatment employed in the bootleg "clean-up." As an example, allyl cyanide, while in itself a very effective denaturant, may be changed very appreciably by the type of chemical treatment to which it is subjected. The most pronounced change is produced when permanganate is used as an oxidant. In this case, the characteristic offensive taste of the cyanide or nitrile is eliminated and instead of it, one can unmistakably notice the presence of the inorganic cyanide. Other oxidizing agents appear to have similar effects but to nowhere near the same extent as permanganate. It is believed that materials belonging to the saturated aldehydes or ketones are not affected by these treatments but unsaturated materials may very likely undergo such a change.

A further advantage is gained by the herein-disclosed combination of denaturants, in that such combination makes the possible "cleaning-up" of such a denatured alcohol composition, by any series of chemical or physical means, very much more difficult than if the alcohol were denatured with any single compound or compounds belonging to this same group.

In combining individual denaturing compounds, the resultant alcohol solution (before the final fractional distillation) will contain a mixture of the desired azeotropic distillation characteristics or several azetropes. By this combination, one may obtain a recovered alcohol far more protected than if it had been denatured originally with a quantity of any one of the several components equal to the proportionate amount found in the combined mixture.

Thus, we have found that two parts of the following denaturant mixtures when added to one hundred parts of ethyl alcohol, of the usual commercial concentration, will resist any of the commercial feasible cleaning-up processes:

*Example No. 1.*—33⅓% each of isovaleraldehyde, pinacolone and allyl cyanide

*Example No. 2.*—50% isovaleraldehyde
37½% mesityl oxide
12½% methyl isobutyl ketone

*Example No. 3.*—70% pinacolone
15% methyl isobutyl ketone
10% mesityl oxide
5% isovaleraldehyde It will be noted that the compounds of each composition belong to different chemical families, as for instance, an aldehyde on one hand;— a saturated ketone on the other hand, as for instance, methyl isobutyl ketone, an unsaturated ketone, like mesityl oxide;—a nitrile like allyl cyanide, ethyl cyanide, iso and normal butyl cyanide and iso and normal amyl cyanide, and an aldehyde like isovaleraldehyde. In place of the valeraldehyde, we may utilize propionaldehyde, butyraldehyde, normal valeraldehyde, or an unsaturated aldehyde such as crotonaldehyde.

Similar equivalents for the saturated and unsaturated ketones may be used.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A denatured alcohol composition including ethyl alcohol and small proportions of a generally pure aliphatic aldehyde having from three to six carbon atoms and generally pure mesityl oxide.

2. A denatured alcohol composition including ethyl alcohol and small proportions of a generally pure aliphatic aldehyde having from three to six carbon atoms and a generally pure nitrile having from three to six carbon atoms and a generally pure ketone.

3. A denatured alcohol composition including ethyl alcohol, and generally pure butyraldehyde, methyl isobutyl ketone, and mesityl oxide;—the combined denaturant compounds being in the proportion of more or less approximately one to two parts, by volume, to one hundred parts of ethyl alcohol of commercial concentration.

4. A denatured alcohol composition including ethyl alcohol, and generally pure butyraldehyde, mesityl oxide and methyl isobutyl ketone;—the combined denaturant compounds being in the proportion of more or less approximately one to two parts, by volume, to one hundred parts of ethyl alcohol of commercial concentration.

5. A denatured alcohol composition including ethyl alcohol, and generally pure pinacolone, methyl isobutyl ketone, mesityl oxide and butyraldehyde;—the combined denaturant compounds being in the proportion of more or less approximately one to two parts, by volume, to one hundred parts of ethyl alcohol of commercial concentration.

6. A denatured alcohol composition including ethyl alcohol, and generally pure butyraldehyde, mesityl oxide and methyl isobutyl ketone;—the combined denaturant compounds being in the proportion of more or less approximately one to two parts, by volume, to one hundred parts of ethyl alcohol of commercial concentration, and the denaturant compounds being in the ratio to each other of more or less approximately 50% of butyraldehyde, more or less approximately 37½% of mesityl oxide, and more or less approximately 12½% of methyl isobutyl ketone (all by volume).

7. A denatured alcohol composition including ethyl alcohol, and generally pure pinacolone, methyl isobutyl ketone, mesityl oxide and butyraldehyde;—the combined denaturant compounds being in the proportion of more or less approximately one to two parts, by volume, to one hundred parts of ethyl alcohol of commercial concentration, and the denaturant compounds being in the ratio to each other of more or less approximately 70% pinacolone, more or less approximately 15% methyl isobutyl ketone, more or less approximately 10% mesityl oxide, and more or less approximately 5% butyraldehyde (all by volume).

PAUL MAHLER.
CARL HANER.